United States Patent [19]

Schuricht et al.

[11] Patent Number: 5,070,463
[45] Date of Patent: Dec. 3, 1991

[54] PARCEL PROCESSING SYSTEM WITH END OF DAY RATING

[75] Inventors: Jurgen Schuricht, Louteral; Armin Zeiss, Lindenfels/Odw., both of Fed. Rep. of Germany

[73] Assignee: Pitney Bowes Inc., Stamford, Conn.

[21] Appl. No.: 608,944

[22] Filed: Nov. 5, 1990

[51] Int. Cl.$^5$ .......................................... G01G 19/40
[52] U.S. Cl. .......................... 364/464.02; 364/464.03
[58] Field of Search ...................... 364/464.02, 464.03, 364/466, 464.01

[56] References Cited

U.S. PATENT DOCUMENTS

| 4,420,819 | 12/1983 | Price et al. | 364/466 |
| 4,574,352 | 3/1986 | Coppola et al. | 364/466 |
| 4,713,761 | 12/1987 | Sharpe et al. | 364/406 |
| 4,839,813 | 6/1989 | Hills et al. | 364/464.03 |
| 4,872,119 | 10/1989 | Kajimoto | 364/464.03 |
| 4,900,904 | 2/1990 | Wright et al. | 364/464.03 |

OTHER PUBLICATIONS

Federal Express: Powership 2 Manual; Oct. 1987; p. 22.7.

Primary Examiner—Salvatore Gangialosi
Attorney, Agent, or Firm—N. Levin; M. J. Scolnick; R. H. Whisker

[57] ABSTRACT

A parcel processing system provides shipping documents required for a number of shipping carriers and/or classes of service. The system includes a keyboard, a scale, a memory, a printer and a processor. The processor receives carrier/service selection signals from the keyboard and transaction data from the keyboard and/or the scale. The processor determines on the basis of the carrier/service selection signal whether to rate or defer a parcel transaction. Data for a deferred transaction is stored in the memory. The foregoing steps are performed with respect to a number of transactions and a number of deferred transactions are combined into an aggregation. The processor receives a deferred rating signal from the keyboard and performs a rating operation with respect to the aggregation of deferred transactions. The printer prints a manifest reflecting the result of the rating operation.

14 Claims, 7 Drawing Sheets

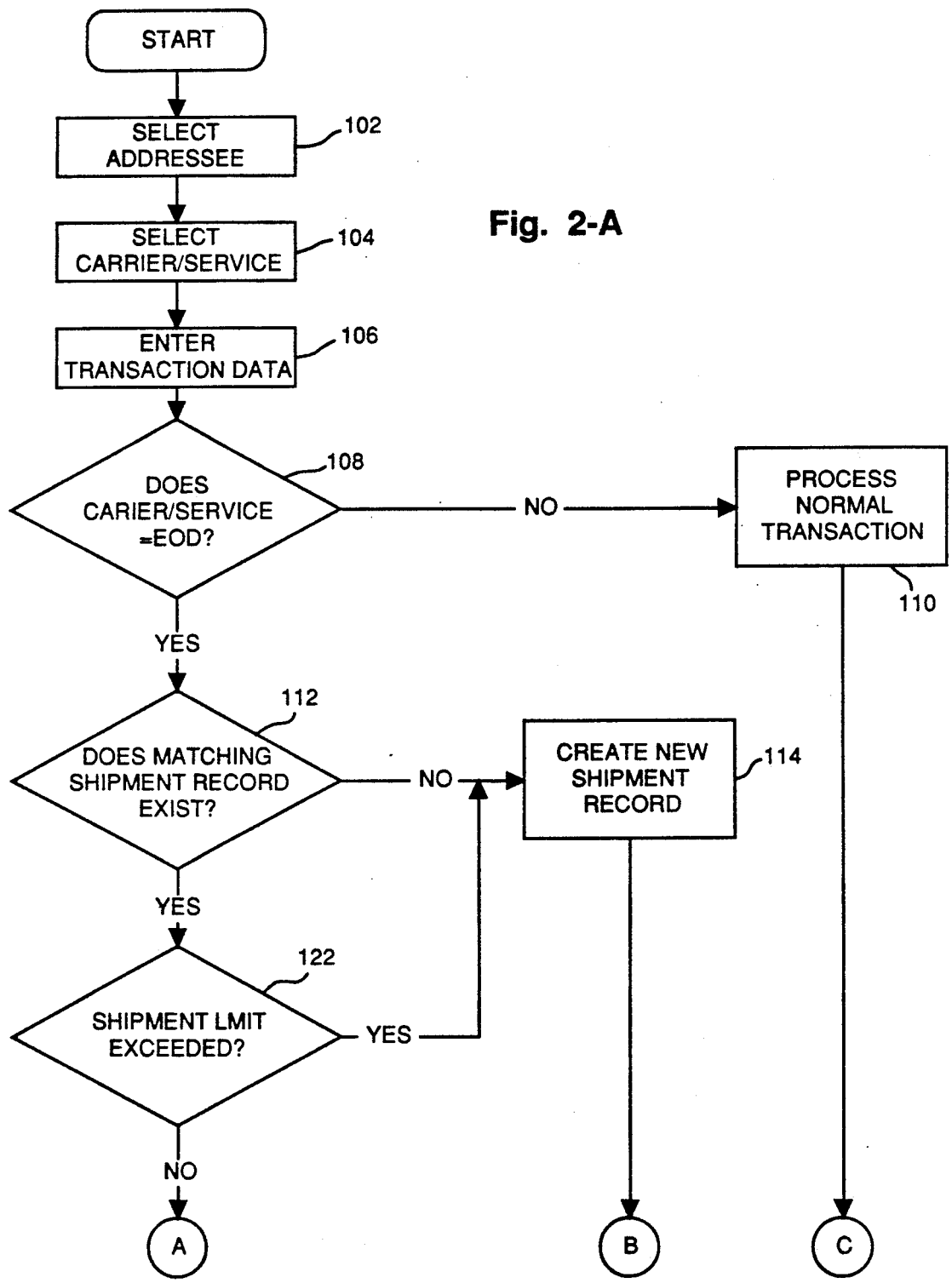
Fig. 2-A

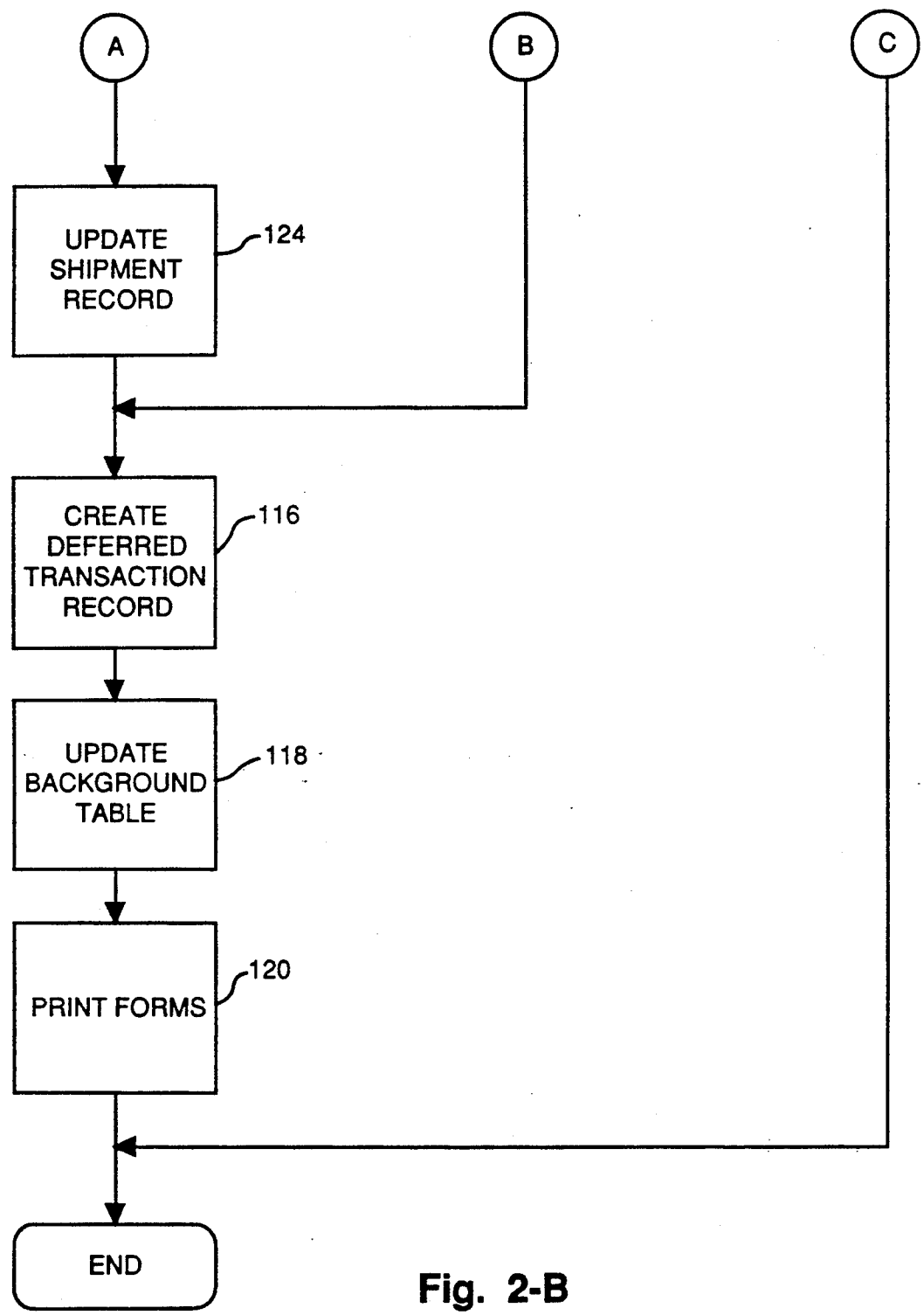
Fig. 2-B

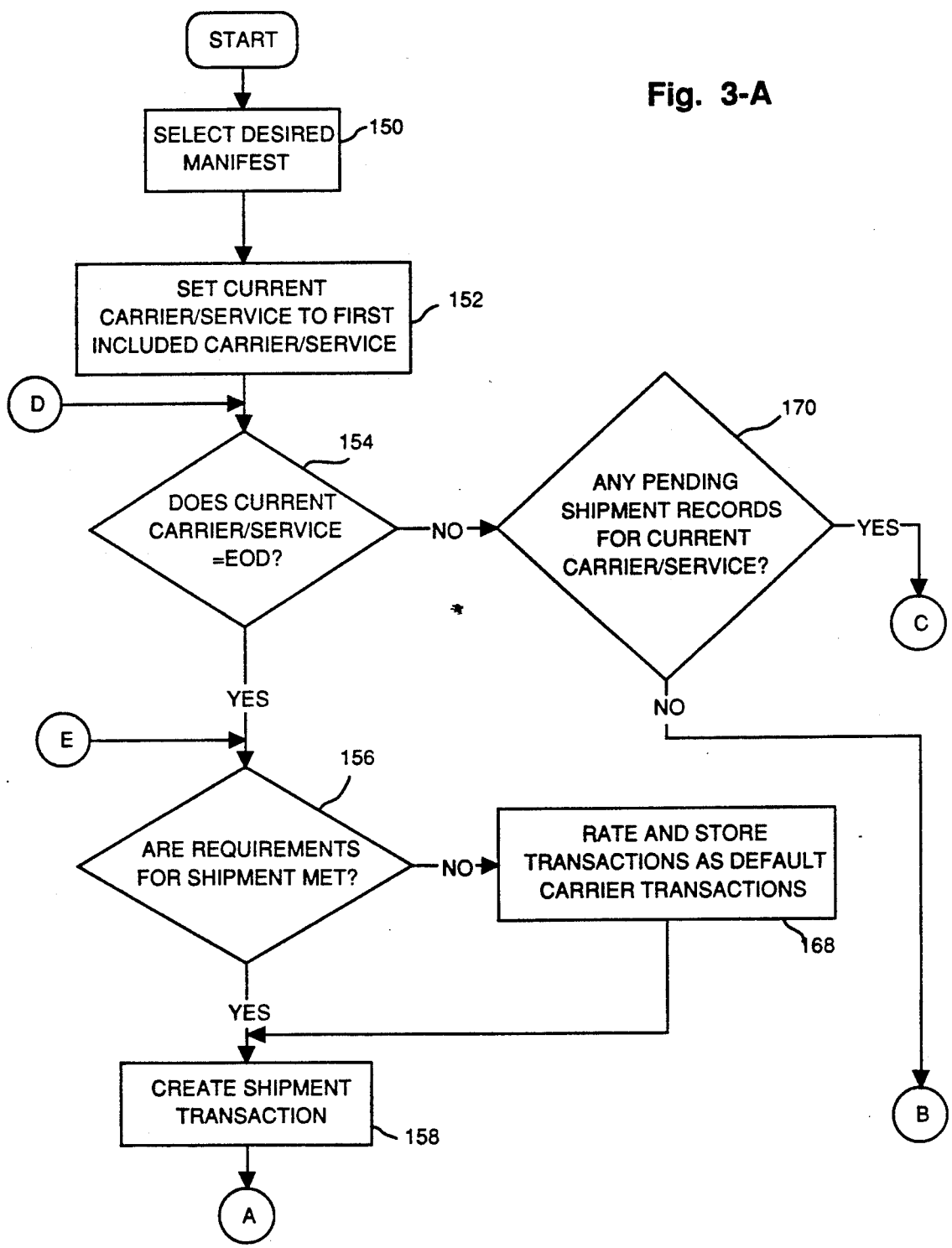
Fig. 3-A

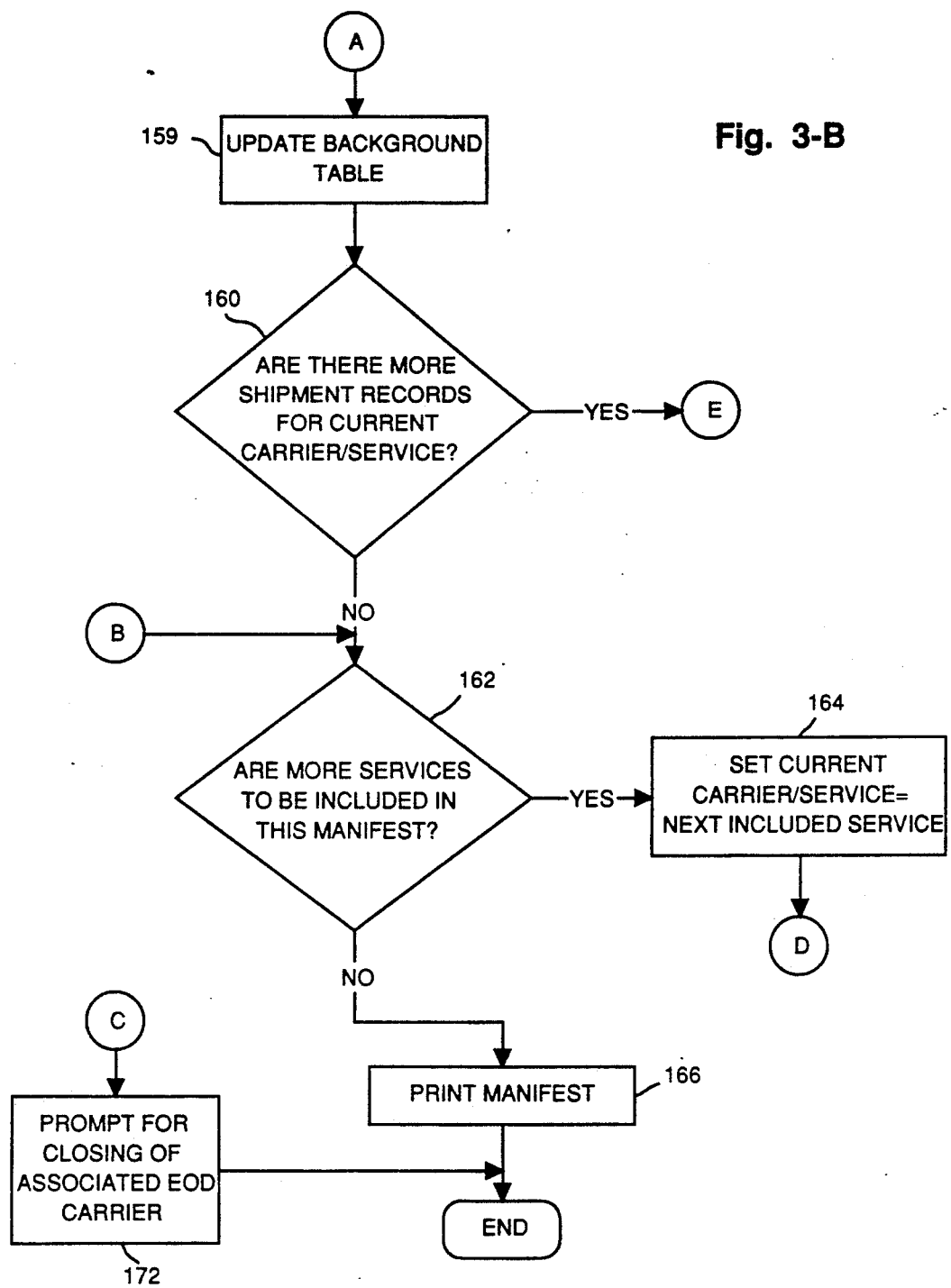
Fig. 3-B

FIG. 4

```
               PRIORITY COURIER SHIPPING MANIFEST
  PAGE 1 OF 1   ACCOUNT       TELEPHONE #
                1234562       494-1555          METHOD OF PAYMENT: 3
    MANIFEST#    SENDER:                         TELEPHONE #
    400 887      PITNEY BOWES OF CANADA          494-1555
                 150 FERRAND DRIVE
                 DON MILLS, ONT.                OFFICE # PERMIT # SERIAL #
                 CANADA MIE 3B4                          G12345   099
```

| ITEM # | SHIPMENT # | ADDRESSEE: | | | |
|---|---|---|---|---|---|
| PP400887516CA | 8 | ALPHA GRAPHICS, CALGARY, ALBERTA | | | |
| POSTAL CODE: | DECL. VALUE: | INDEM. FEE: | WEIGHT: | SERVICE: | FEE: |
| T5C3M4 | $ | $ | 9 KG | 1 | $58.55 |

| ITEM # | SHIPMENT # | ADDRESSEE: | | | |
|---|---|---|---|---|---|
| PP400887520CA | | FAR EAST CORP., VANCOUVER, B.C. | | | |
| POSTAL CODE: | DECL. VALUE: | INDEM. FEE: | WEIGHT: | SERVICE: | FEE: |
| V5C4G9 | $ 600.00 | $ .37 | 8 KG | 1 | $16.50 |

| ITEM # | SHIPMENT # | ADDRESSEE: | | | |
|---|---|---|---|---|---|
| PP400887533CA | 8 | ALPHA GRAPHICS, CALGARY, ALBERTA | | | |
| POSTAL CODE: | DECL. VALUE: | INDEM. FEE: | WEIGHT: | SERVICE: | FEE: |
| 123456 | $ 1,000.00 | $ 4.00 | 23 KG | 1 | $123.00 |

| ITEM # | SHIPMENT # | ADDRESSEE: | | | |
|---|---|---|---|---|---|
| PP400887547CA | | WHELEY ROYCE, TORONTO, ONT. | | | |
| POSTAL CODE: | DECL. VALUE: | INDEM. FEE: | WEIGHT: | SERVICE: | FEE: |
| MJ51C3 | $ | $ | 3 KG | 1 | $15.00 |

| ITEM # | SHIPMENT # | ADDRESSEE: | | | |
|---|---|---|---|---|---|
| PP400887555CA | | EAGLE GRAPHICS, OTTAWA, ONT. | | | |
| POSTAL CODE: | DECL. VALUE: | INDEM. FEE: | WEIGHT: | SERVICE: | FEE: |
| K2P5G7 | $ | $ | 2 KG | 1 | $7.40 |

| ITEM # | SHIPMENT # | ADDRESSEE: | | | |
|---|---|---|---|---|---|
| PP400887564CA | 8 | HARLAND PRINTING, NEPEAN, ONT. | | | |
| POSTAL CODE: | DECL. VALUE: | INDEM. FEE: | WEIGHT: | SERVICE: | FEE: |
| K3E6Z7 | $ | $ | 1 KG | 1 | $3.80 |

```
                                    TOTAL FEE: $     224.55
                            PAGE INDEMNITY FEE: $       4.37
                                PAGE SUB TOTAL: $     228.92
                                    PICKUP FEE: $       3.00
  SENDERS SIGNATURE:         TOTAL PREVIOUS PAGES: $    0.00
                                GRAND TOTAL FEE: $     231.92

ACCEPTED BY:    DATE:     TIME:
                  11/01/91  16:07
```

FIG. 5

```
PITNEY BOWES                                              PAGE 1
150 FERRAND DRIVE           UPS MANIFEST        SHIPPER NUMBER: 50X-51
TORONTO ONTARIO                                         DATE : 06/07/
M3C 3B5                                         PICKUP NUMBER : 103650

TRANS  PACKAGE I.D.  P.CODE/  KG/      CHARGES   COD     DV      AOD OS CT
                     ZONE     LBS.OZ*

1    1000020199    M2B/1    12 000      4.13
  2    1000020200     /87     21 000     17.00
  3    1000020201    L3S/1    12 000      7.88   311.00  420.00
  4    1000020202     /22     12 000     19.70
  5    1000020203     /87     15 000     17.00
  6    1000020204    M5H/1    13 021      5.22           352.02
  7    1000020205     /95     15 000    205.00
  8    1000020206    G8G/3    21 000      8.29
  9    1000020207     /98     25 023    544.00
 10    1000020208    H1N/3    31 000     10.05                       *
 11    1000020209    N1S/2    21 000      7.44

SUMMARY                2 AIR
                       8 GROUND
                       1 AIR FILTER

_____ WEIGHT _____ CHARGES ___ COD __ DV __ AOD __ OS __ CT

KG       198    044      845.71
LBS.OZ*    0   0 0.0*      0.00

TOTAL CHARGES            845.71    1       2     1      0    1
                                   3.00    3.50  .40    0.00 0.00

EXCESS VALUE:  14 UNITS    3.50

GRAND TOTAL    852.61
```

PARCEL PROCESSING SYSTEM WITH END OF DAY RATING

FIELD OF THE INVENTION

This invention relates to parcel shipping systems that automatically calculate shipping charges for parcels to be shipped. More particularly, this invention relates to such systems that print parcel manifests.

BACKGROUND OF THE INVENTION

Parcel processing systems are known. See, for example, U.S. Pat. No. 4,839,813, the disclosure of which is incorporated herein by reference.

A typical parcel processing system includes a processor, a memory, a keyboard, a display and a scale. In a typical operation, (sometimes referred to as a "transaction") the system's operator places a parcel on the scale. The scale provides weight information to the processor. A parcel identification number is input through the keyboard or automatically generated by the system. The system prompts the operator, via the display, to select a carrier and/or a class of service for the parcel. Via the keyboard, the operator then selects a carrier/class of service. Often, the operator also is required to enter a postal code or a delivery zone or other information regarding the intended destination of the parcel. The operator may also be required to enter other information, such as the parcel's volume.

The system's memory includes a rate information data base. Based on the parcel's weight, the selected carrier/class of service and the input destination information, the processor uses the stored rate information to calculate the carrier's charge for transporting the parcel to the intended destination. The calculated charge is then displayed. The process of calculating the shipping charge is sometimes referred to as "rating".

The operator may select a number of special services, such as C.O.D. insurance, etc., and if he does, the system adds the charges for these services to the previously calculated service charge. The operator also may input, or be required by the system to input accounting or other information related to the parcel, such as customer account number, department number, invoice number and so forth.

When all required information has been input and the operator is satisfied with the transaction, he then actuates a "print" key or takes a similar action to complete the transaction. The system then prints a label and/or other items required by the selected carrier. The system also stores information relating to the transaction for later printing as part of a manifest. The information typically includes the parcel's weight, the selected carrier/service, destination information, selected special services, the applicable shipping charge, and accounting information. In some cases, the carrier may require that the manifest be printed in "real time", in which case the appropriate line or lines of the manifest are printed out immediately upon completion of the transaction. In those cases, the information usually continues to be stored for use in accounting reports or in case it is later decided to reverse or "void" the transaction.

Parcel processing systems as described above, in which each individual parcel transaction is rated, have proven to be useful in preparing parcels for shipment. However, a number of parcel carriers have introduced parcel rating plans that allow aggregation of a number of parcels for rating purposes as an alternative to the traditional parcel by parcel rating. Although there have been provided parcel processing systems dedicated to a single carrier that allow parcels sent to a single recipient to be aggregated for rating purposes, there have been no multiple carrier parcel processing systems that perform aggregate rating of parcel transactions.

SUMMARY OF THE INVENTION

A parcel processing system according to the invention includes a selection mechanism for sending carrier/service selections signals; an entry mechanism for entering transaction data; a memory; a mechanism for generating a manifest; and a processor connected to the selection mechanism, the entry mechanism, the memory and the generating mechanism. The processor is programmed to (i) receive a carrier/service selection signal for a parcel transaction; (ii) receive transaction data for the parcel transaction; (iii) determine, on the basis of the carrier/service selection signal, whether the parcel transaction is to be rated or deferred; (iv) if the parcel transaction is to be deferred, store the transaction data in the memory without rating the transaction; (v) repeat functions (i) through (iv) with respect to at least one additional parcel transaction; (vi) combine at least some of the transaction data of at least two deferred transactions so as to form an aggregation of deferred transactions; (vii) receive a deferred rating signal; (viii) perform a rating operation with respect to the aggregation of deferred transactions; and (ix) cause the generating mechanism to generate a manifest that reflects a result of the rating operation.

BRIEF DESCRIPTION OF THE DRAWINGS

In order that the invention may be more clearly understood, it will now be disclosed in greater detail with reference to the accompanying drawings, wherein:

FIGS. 2-A, 2-B are a flow chart illustrating the processing of a parcel transaction by the system of FIG. 1.

FIGS. 3-A, 3-B are a flowchart illustrating the generation of a manifest by the system of FIG. 1.

FIG. 4 is a sample of a manifest printed by the system of FIG. 1.

FIG. 5 is a sample of a manifest printed by a prior art parcel processing system.

DETAILED DESCRIPTION OF THE PREFERRED EMBODIMENTS OF THE INVENTION

Figure 1:
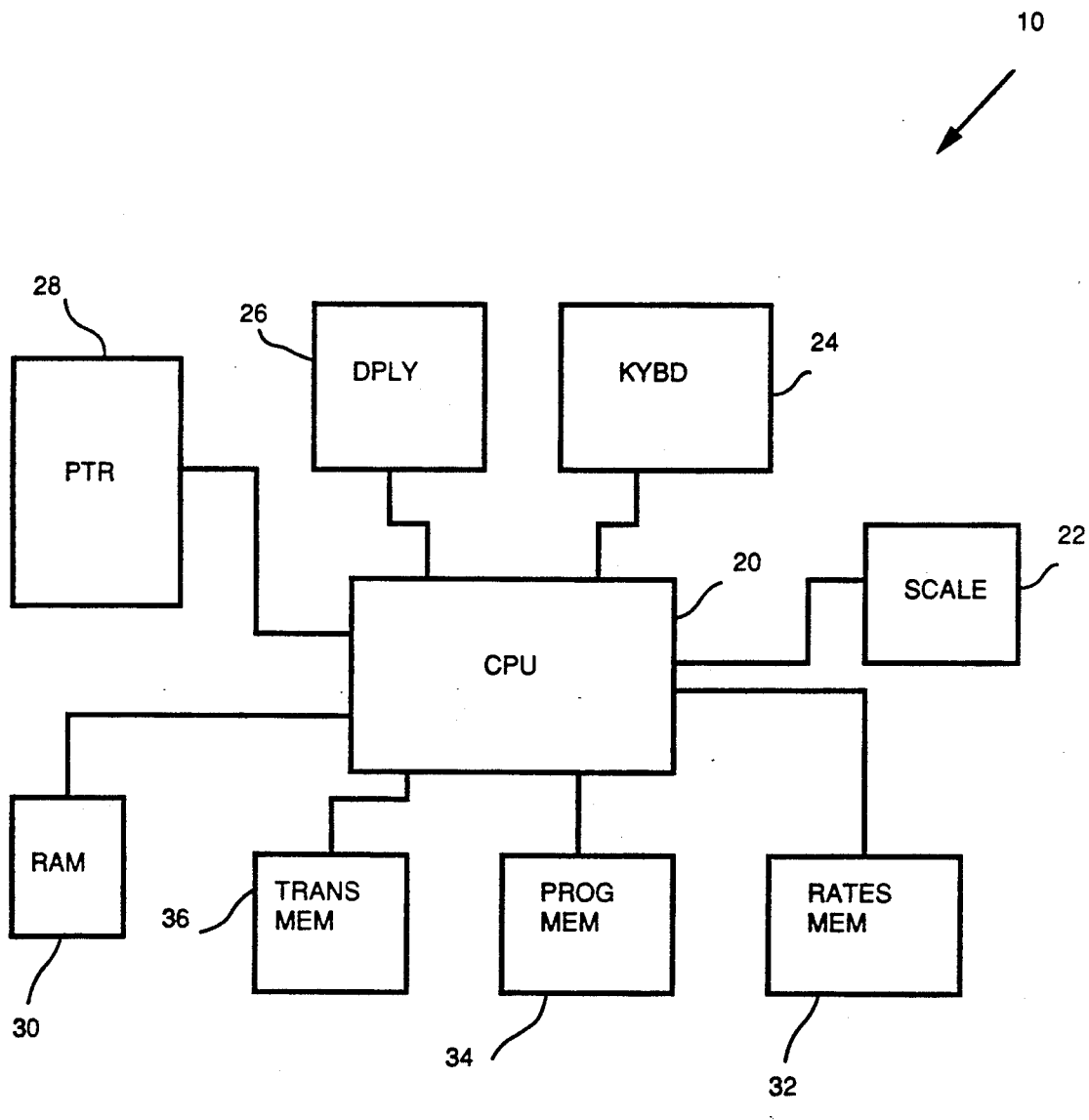
FIG. 1 is a block diagram of a parcel processing system in accordance with the invention.

Referring now to FIG. 1, reference numeral 10 designates a parcel processing system in accordance with the invention. System 10 includes CPU 20, which may be a conventional microprocessor such as a model 80286 microprocessor available from Intel Corporation, Santa Clara, Calif. Scale 22 is interfaced by conventional means to CPU 20 and is operable to provide to CPU 20 information concerning the weight of a parcel (not shown) that is desired to be shipped. Scale 22 may be a model A-217 platform scale available from Pitney Bowes Inc., Stamford, Conn. System 10 further comprises keyboard 24 which is connected to CPU 20 and is operable by a human operator for the purpose of selecting a desired carrier and/or class of service and for inputting information. Display 26 is connected to, and under the control of, CPU 20 and displays prompt messages and other information to assist the operator in using system 10.

Printer 28 also is connected to, and controlled by, CPU 20, and is used for printing manifests and may also be used for printing labels, waybills, reports, etc. Printer 28 may be a model 7200, available from Juki Corporation, Chofu-shi, Tokyo, Japan or another conventional printer used with microcomputer systems. As will be understood by those skilled in the art, system 10 may also comprise one or more additional printers for printing labels, waybills, reports and so forth.

As is common in microprocessor-based systems, system 10 also includes random access memory (RAM) 30, which may be used by CPU 20 for rapid storage and/or retrieval of data and for other purposes. System 10 also includes rates memory 32 that stores rate information for a plurality of carriers and/or classes of service. Program memory 34 stores the program or programs that control the operation of CPU 20. Transaction memory 36 is accessed by CPU 20 for storage and retrieval of parcel transaction information.

The components of system 10, other than scale 22 and printer 28 may be realized in the form of a conventional microcomputer system such as the model PC 810 available from NCR Corporation, Dayton, Ohio. Program memory 34 and rates memory 32 may be in the form of a fixed or removable disk or disks, in which case some or all of the contents of memories 32, 34 may be loaded into RAM 30 upon system initialization or at other appropriate times to facilitate rapid access by CPU 20 to the information stored in memories 32, 34. Transaction memory 36 may also be in the form of disk storage. Alternatively, or additionally, transaction information may be stored in RAM 30 or in another read/write memory element, either of which may be battery-backed-up.

As will be recognized by those skilled in the art, system 10 may also take the form of a "scale-based" parcel processing system, of which an example is the STAR 110 model available from the aforementioned Pitney Bowes Inc. Thus, CPU 20, scale 22, keyboard 24, display 26 and memories 30, 32, 34, 36 may all be housed in a single unit. Memories 32, 34 may take the form of one or more programmable read only memories (PROMS).

FIG. 2 illustrates operation of system 10 in processing a transaction. A transaction processing operation may be started by placement of a parcel on scale 22 or by entry of an appropriate command via keyboard 24.

At step 102 an addressee for the parcel is selected. In a preferred embodiment of system 10, system 10 comprises an addressee database, so that a desired addressee may be selected from the database. However, in another embodiment of system 10, in which there is no addressee database, or if the desired addressee is not stored in the database, the operator may input the name and address of the addressee via keyboard 24. As will be understood by those skilled in the art, in an alternative embodiment of FIG. 10, step 102 may be omitted, or may consist only of inputting a postal code or zone.

At step 104, a desired carrier and, optionally a desired class of service is selected. As is known in the art, keyboard 24 may comprise special keys, each of which is dedicated to a particular carrier or class of service. If there is a dedicated key for the desired carrier/service the operator sends a carrier/service selection signal by pressing the appropriate key. Otherwise, or if there are no dedicated keys, the carrier/service selection signal is sent by keyboard entry of the name or code corresponding to the desired carrier/service. Carrier/service selection by means of a menu is also contemplated by this invention. As is known in the art, in a certain mode of operation of system 10, the carrier/service selected for the previous transaction is automatically carried over to the current transaction.

At step 106 transaction data is entered by use of keyboard 24. The transaction data may include, for example, a parcel identification number, an invoice number, the value of the parcel, the time and date of desired delivery, a customer identification number or a cost center or department number, a handling charge, desired special services (such as C.0.D., insurance, etc.), the dimensions of the parcel, the weight of the parcel, or the distance the parcel is to be shipped.

As will be appreciated by those skilled in the art, entry of at least some of the transaction data may be by means other than keyboard 24. For instance, if the parcel has been placed upon scale 22, scale 22 may transmit a weight data signal to CPU 20. A bar code scanning wand (not shown) may enter data such as an invoice number or a parcel i.d. number by scanning a bar code that has been affixed to the parcel. As a further alternative, it is known to provide a program that automatically increments the parcel identification number from one transaction to the next.

In any event, CPU 20 receives the aforementioned carrier/service selection signal and also receives the aforementioned transaction data.

At step 108 system 10 determines whether the selected carrier/service is one that has been designated for deferred rating. (Such a carrier/service will sometimes be referred to as an "end-of-day" carrier/service.) This is determined by reference to carrier/service data that may, for instance, be stored in rates memory 32. If the selected carrier/service is not an "end-of-day" carrier/service, system 10 handles the transaction like the typical parcel processing operation described above, by rating the transaction and printing required labels and/or other documents and either printing a line corresponding to the transaction in a "real time" manifest or storing the transaction for subsequent printing in a manifest (step 110). The operation for processing the current transaction then ends.

If at step 108 system 10 determines that the selected carrier/service is an "end-of-day" carrier/service, system 10 then proceeds to step 112, at which it determines whether the current transaction matches an existing shipment record that has been created with respect to a prior transaction or transactions. As will be discussed in more detail below, a shipment record contains data regarding one or more transactions which are to be included in a shipment and which rating has been deferred. The criterion or criteria by which the current transaction may be matched to an existing shipment record may, for example, be specified by the carrier and may be stored in rates memory 32.

In a preferred embodiment of system 10, the current transaction will not be considered to match an existing shipment record unless the carrier/service selected for the current transaction is in the same "shipment group" as the selected carrier/service of the transaction(s) of the shipment record. Customarily a shipment group is defined by a carrier and consists of a number of services, the transactions of which may be aggregated for rating purposes. Assuming that the selected carrier/service for the current transaction falls into a shipment group of an existing shipment record, it must then be determined whether the current transaction satisfies the matching criterion or criteria for the shipment record. Again, the criteria or criterion are specified by the carrier. In a preferred embodiment, system 10 supports the following matching criteria: order number, customer number, order and customer number, order or customer number, postal code, or zone. In that embodiment, only one of the above criteria is applicable to each shipment group.

Assuming that at step 112 no matching shipment record was found (as would be the case, for instance, for the first transaction of the day for which an end-of-day carrier/service was selected), then step 114 follows at which a new shipment record is created. The shipment record includes data which identifies the applicable shipment group, the matching criterion or combination of criteria and the number identifying the particular shipment record. The shipment record also includes fields for identifying all the parcels to be included in the shipment and aggregation fields such as number of parcels included in the shipment, total weight of all the parcels, total value of all the parcels, total volume of all the parcels and so forth. As will be seen, the shipment record will be used to rate in the aggregate all of the transactions included in the record and to prepare a manifest that will reflect those transactions and the aggregate rating.

Following step 114, the system creates and stores a deferred transaction record for the current transaction (step 116). This record includes all of the transaction data for the current transaction and also data indicating the shipment record to which the current transaction has been posted. It will be understood that the deferred transaction record differs from a normal stored transaction by the presence of the information referring to the shipment record and also by the absence of shipping charge information for the current transaction.

Step 118 follows step 116. At step 118 the "default carrier" background table is updated. As the purpose of default carriers is explained in more detail below, it will suffice at this point to state that a default carrier/service is associated with each end-of-day carrier/service. If the minimum requirements, discussed below, for end of day rating are not met, the transactions assigned to that end-of-day carrier/service will be reassigned to the associated default carrier/service. As will be seen it is necessary to keep track of the existence of transactions that may be assigned to the default carrier/service, and the background table performs this function. Thus, the background table is updated, at step 118, to reflect the fact that a shipment record has been created that may later be assigned to the associated default carrier/service.

In a preferred embodiment the background table takes the following form:

| Default/carrier Service | No. of shipment records |
| --- | --- |
| Carrier/Service A | 0 |
| Carrier/Service B | 2 |
| Carrier/Service C | 1 |
| Carrier/Service D | 5 |

The updating then takes the form of adding one to number of shipment records pending for the appropriate default carrier/service. (It will be appreciated that the entries shown in the table are examples of possible entries).

Following step 118 is step 120, at which the system 10 prints labels, waybills or other forms that relate to the parcel of the current transaction. It will be understood that no "real time" manifest item is printed and that the deferred transaction record described above takes the place of the normal transaction record that is usually stored for later generation of a manifest.

Returning to step 112, if a matching shipment record is found to exist for the current transaction, step 122 then follows at which system 10 determines whether addition of the current transaction to the matching shipment record would cause a shipment limit for that record to be exceeded. By way of explanation, the carrier may choose to set a limit to the total number of parcels to be included in a single shipment. In addition to, or instead of, such a limit, a carrier may choose to limit total volume, total value, or total weight of the parcels included in a single shipment. Thus at step 122 system 10 determines whether the relevant limits are exceeded by, for instance, incrementing the parcel count in the matching shipment record by one and determining whether the limit is then exceeded and/or increasing the entries in the matching shipment record that correspond to total weight, or total volume or total dollar value by the respective entries in the transaction data for the current transaction and again testing whether the applicable limit is exceeded. If it is determined at step 122 that the limit was exceeded, then a new shipment record is created as described above in step 114. Steps 116, 118 and 120 then follow as described above. It should also be noted that thereafter the previous shipment record, for which the limit would have been exceeded, is closed, and will no longer be considered a matching shipment record for any further transaction.

If, at step 122 the shipment limit is not exceeded, then the shipment record is updated to increment the number of parcels by one, and there are added to the other relevant entries of the shipment record, the entries in the transaction data for the current transaction (step 124). It will be recognized that the current transaction can be considered to have been added to or included in the matching shipment record and that the shipment record represents an aggregation of all the transactions that have been included in it. Then, as before, steps 116, 118 and 120 follow.

During daily operation of system 10, a considerable number of transactions are processed in accordance with the procedure of FIG. 2. It can be expected that a number of shipment records will be established, each comprising an aggregation of deferred, unrated transactions. A number of "normal", i.e. not deferred, rated transactions, will also be stored. The daily operation will ordinarily conclude with printing of one or more manifests, as described in connection with FIGS. 3-A, 3-B.

FIGS. 3-A, 3-B are a flowchart illustrating operation of system 10 to print a manifest. Typically, the user will wish to print a manifest at the end of the shipping day or at a set time shortly before a carrier's representative is due to arrive for the purpose of picking up a group of parcels for shipment. The operation begins with actuation of keyboard 24 by the user to send a signal indicating that the user desires to generate a manifest. System 10 then prompts the user to select which manifest is to be printed. In a preferred embodiment of system 10, at least some of the manifests that system 10 is capable of printing include transactions for a plurality of classes of service. After the user has selected the manifest which is desired to be printed (step 150) system 10 designates the first service to be included in the manifest as the "current carrier/service" (step 152). Step 154 then follows, at which system 10 determines whether the current carrier/service is one for which end-of-day rating is performed. If so, step 156 follows at which system 10 determines whether the shipment record for the current carrier service meets minimum requirements that have been established by the carrier. Typically such minimum requirements may take the form of a required minimum number of parcels in the shipment, or minimum total weight, etc., or some combination of such minimum requirements.

If the minimum requirements are met, system 10 proceeds to step 158 at which it creates a shipment transaction corresponding to the shipment record. In creating the shipment transaction, system 10 applies aggregate rating information, stored in rates memory 32, to the information stored in the current shipment record so as to calculate a shipping charge for all the parcels included in the shipment record. Depending on the carrier's requirements, the shipping charge may depend on the total number of the parcels, and their weight, volume and destinations, or a combination of all or some of these factors. The resulting shipping charge may be a single charge applicable to the entire shipment transaction or may be allocated among the parcels. In either case, the calculated shipping charge reflects the aggregation of the parcels into the shipment record.

Step 159 then follows, at which the background table is updated by subtracting one from the number of shipment records pending for the appropriate default carrier/service.

Step 160 follows, at which system 10 determines whether there are more stored shipment records for the current carrier/service. If so, the system returns to step 156, as described above. If not, step 162 follows, at which system 10 determines whether there are any further services to be included in the requested manifest. If so, system 10 considers the next service to be included to be the current carrier/service (step 164), and then returns to step 154, which is described above. If there are no further services to be included in the manifest, step 166 follows, at which printer 28 prints the desired manifest. As will be appreciated by those skilled in the art, although the embodiment described herein refers to printing of a manifest, it is also possible to generate manifests for presentation to a carrier in the form of data stored on a disk or other portable, machine readable medium or by communicating data representing the manifest over telecommunication facilities by use of a modem. Henceforth, "generating a manifest" should be understood to include printing a manifest as well as these other methods of presenting manifest information to a carrier.

Returning to the determination made at step 156, if system 10 determines that the minimum requirements for shipment are not met by the shipment record currently under consideration, system 10 treats each of the transactions associated with the shipment record as transactions for which the default carrier/service was selected. In effect, the system reassigns these transactions to the default carrier/service. The default carrier/service is a class of service mandated by the carrier to be applied to a transaction for which an end of day service was selected but for which minimum shipment requirements were not met. Thus at step 168, system 10 proceeds to rate each individual transaction included in the shipment record on the basis of the rating information for the applicable default carrier/service. The result is a rated transaction for an individual parcel that is the same as if the default carrier/service had initially been selected for that parcel. From step 168 system 10 then proceeds to step 159, described above.

Returning to the determination made at step 154, if the current carrier/service is not one for which end-of-day rating is performed, system 10 proceeds to step 170 at which it determines from the background table whether there are any pending shipment records for the current carrier/service. If not, step 162, which has been described above, follows. If the entry for current carrier/service in the background table is other than '∅', then as will be appreciated in light of the preceding discussions of steps 118 and 159, the current carrier/service must be the default carrier/service for an end-of-day carrier/service that has not been "closed out"; i.e. there must be at least one shipment record for that end-of-day service that has yet to be processed through steps 158 or 168. Accordingly, system 10 proceeds to step 172 and displays on display 26 a prompt message advising the user to close the end of day carrier/service or services associated with the current carrier/service. The routine then ends, allowing the user to select the manifest required for the associated end-of-day carrier/service to be processed, thereby clearing the pending shipment record or records from the background table, as described in connection with step 159.

FIG. 4 is an example of a manifest printed by system 10. An example of a manifest produced by a prior art system is reproduced for purposes of comparison as FIG. 5.

It will be noted that in each transaction of the manifest of FIG. 4 there is a field labeled "Shipment #". In several of the parcel transactions shown on FIG. 4, that field is blank, indicating that those transactions were not combined into a shipment and were rated separately. Three of the parcels are shown to be in "shipment #8", indicating that those three parcels were combined into a shipment (also referred to as an "aggregation") and were rated together. As shown in FIG. 4, the aggregate fee for shipment #8 was allocated among the three parcels in the shipment. However, it is also within the contemplation of the present invention that the fee for each parcel be shown as $0.00 and that the aggregate fee for the shipment appear on the manifest on a separate line as shown below:

| Shipment #8. | Aggregate fee: $185.35 |
|---|---|

As another alternative an aggregate fee may be shown for the shipment and another fee, as for example, a small flat fee, may be shown for each parcel in the shipment.

Those skilled in the art will recognize that the embodiments described above and illustrated in the attached drawings are intended for purposes of illustration only and that the subject invention may be implemented in various ways. Thus, it is to be understood that the embodiments described above are not to be considered as limiting and limitations on the subject invention are to be found only in the attached claims.

What is claimed is:

1. A parcel processing system for providing shipping documents required for a plurality of classes of service, comprising:
   (a) selection means for sending carrier/service selection signals;
   (b) entry means for entering transaction data;
   (c) a memory;
   (d) means for generating a manifest; and
   (e) a processor connected to said selection means, said entry means, said memory and said generating means; said processor being programmed to:
      (i) receive a carrier/service selection signal, said signal indicating selection of one of said plurality of classes of service for a parcel transaction;
      (ii) receive transaction data for said parcel transaction;
      (iii) determine on the basis of said carrier/service selection signal, whether said parcel transaction is to be rated or deferred;
      (iv) if said parcel transaction is to be deferred, store said transaction data in said memory without rating said transaction;
      (v) repeat functions (i) through (iv) with respect to at least one additional parcel transaction;
      (vi) combine at least some of the transaction data of at least two deferred transaction so as to form an aggregation of deferred transactions;
      (vii) receive a deferred rating signal;
      (viii) perform a rating operation with respect to said aggregation of deferred transactions; and
      (ix) cause said generating means to generate a manifest, said manifest reflecting a result of said rating operation.

2. The parcel processing system of claim 1, wherein said selection means comprises a keyboard.

3. The parcel processing system of claim 1, wherein said entry means comprises a keyboard.

4. The parcel processing system of claim 1, wherein said generating means comprises a printer, said processor causing said printer to print said manifest.

5. The parcel processing system of claim 1, wherein said processor compares said aggregation of deferred transactions to a predetermined maximum limitation, said processor adding an additional deferred transaction to said aggregation only if said limitation is not exceeded.

6. The parcel processing system of claim 5, wherein said processor compares said aggregation to a predetermined minimum requirement, said processor performing said rating operation only if said minimum requirement is met, said processor performing a separate rating of each of said deferred transactions of said aggregation if said minimum requirement is not met, said separate rating being based upon rating information for a default carrier/service, said default carrier/service being associated with the carrier/service selected for said each transaction.

7. The parcel processing system of claim 6, wherein said memory stores a background table, said table for storing codes representing default carriers/services, each of said default carriers/services being associated with a carrier/service designated for deferred rating and selected for at least one transaction, said processor receiving a manifest selection signal, said signal selecting a manifest to be generated, said selected manifest including at least one of said default carriers/services, said processor determining whether a code representing said at least one default carrier/service is stored in said background table, said processor delaying generation of said selected manifest if said processor determines said code is stored in said background table.

8. The parcel processing system of claim 5, wherein said memory stores a match criterion for said aggregation of deferred transactions and said processor adds a deferred transaction to said aggregation only if said transaction satisfies said match criterion.

9. In a parcel processing system comprising selection means for sending carrier/service selection signals, entry means for entering transaction data, a memory, manifest generating means and a processor, the method comprising:
   (a) receiving a carrier/service selection signal;
   (b) receiving transaction data for a parcel transaction;
   (c) determining on the basis of said received carrier/service selection signal whether said parcel transaction is to be rated or deferred;
   (d) if said parcel transaction is to be deferred, storing said transaction data in said memory without rating said transaction;
   (e) repeating steps (a) through (d) with respect to at least one additional parcel transaction;
   (f) combining at least some of the transaction data of at least two deferred transactions so as to form an aggregation of deferred transactions;
   (g) receiving a deferred rating signal;
   (h) performing a rating operation with respect to said aggregation of deferred transactions; and
   (i) generating a manifest, said manifest reflecting a result of said rating operation.

10. The method of claim 9, comprising the additional steps of:
    comparing said aggregation of deferred transactions to a predetermined maximum limitation; and
    adding an additional transaction to said aggregation only if said limitation is not exceeded.

11. The method of claim 10, wherein said combining step comprises comparing said aggregation to a predetermined maximum limitation, and adding an additional transaction to said aggregation only if said limitation is not exceeded.

12. The method of claim 11, further comprising, after said step of receiving a deferred rating signal, the step of comparing said aggregation to a predetermined minimum requirement and, if said minimum requirement is not met;
    not performing said rating operation; and
    performing a separate rating of each of said deferred transactions of said aggregation, said separate rating being based upon rating information for a default carrier/service, said default carrier/service being associated with the carrier/service selected for said each transaction.

13. The method of claim 12, further comprising the steps of:
    storing a background table in said memory, said table for storing codes representing default carriers/services, each of said default carriers/services being associated with a carrier/service designated for deferred rating;
    receiving a manifest selection signal, said signal selecting a manifest to be generated, said selected manifest including at least one of said default carriers/services;
    determining whether a code representing said at least one default carrier/service is stored in said background table; and delaying generation of said selected manifest if it was determined that said code is stored in said background table.

14. The method of claim 11, further comprising the step of storing in said memory a match criterion for said aggregation and wherein said combining step comprises determining whether said additional deferred transaction satisfies said match criterion.

* * * * *